(12) United States Patent
Boyle et al.

(10) Patent No.: US 9,456,174 B2
(45) Date of Patent: Sep. 27, 2016

(54) NEURAL NETWORK FOR VIDEO EDITING

(71) Applicant: H4 Engineering, Inc., San Antonio, TX (US)

(72) Inventors: Christopher T. Boyle, San Antonio, TX (US); Alexander G. Sammons, San Antonio, TX (US); Scott K. Taylor, San Antonio, TX (US)

(73) Assignee: H4 Engineering, Inc., San Antonio, TX (US)

( * ) Notice: Subject to any disclaimer, the term of this patent is extended or adjusted under 35 U.S.C. 154(b) by 40 days.

(21) Appl. No.: 14/600,177

(22) Filed: Jan. 20, 2015

(65) Prior Publication Data

US 2015/0208023 A1    Jul. 23, 2015

Related U.S. Application Data

(60) Provisional application No. 61/929,441, filed on Jan. 20, 2014.

(51) Int. Cl.
| | |
|---|---|
| *H04N 5/93* | (2006.01) |
| *H04N 5/91* | (2006.01) |
| *G11B 27/034* | (2006.01) |
| *H04N 5/765* | (2006.01) |
| *H04N 21/00* | (2011.01) |
| *H04N 9/82* | (2006.01) |
| *H04N 21/218* | (2011.01) |

(52) U.S. Cl.
CPC ............... *H04N 5/91* (2013.01); *G11B 27/034* (2013.01); *H04N 5/765* (2013.01); *H04N 9/8205* (2013.01); *H04N 21/00* (2013.01); *H04N 21/21805* (2013.01)

(58) Field of Classification Search
CPC .......... H04N 21/00; H04N 21/21805; H04N 5/765; H04N 5/09; H04N 9/8205; H04N 27/034
USPC .................. 386/278, 281, 282, 286, 290
See application file for complete search history.

(56) References Cited

U.S. PATENT DOCUMENTS

2012/0077522 A1* 3/2012 Mate .................. H04N 21/2187
455/456.3

* cited by examiner

*Primary Examiner* — Robert Chevalier
(74) *Attorney, Agent, or Firm* — Volk & McElroy, LLP; Michael D. Volk, Jr.

(57) ABSTRACT

An automated video editing system uses user inputs and metadata combined with machine learning technology to gradually improve editing techniques as more footage is edited. The system is designed to work primarily with a network of automated video recording systems that use cooperative tracking methods. The system is also designed to improve tracking algorithms used in cooperative tracking and to enable systems to begin using image recognition based tracking when the results of machine learning are utilized.

20 Claims, 3 Drawing Sheets

NEURAL NETWORK FOR VIDEO EDITING

CROSS-REFERENCE TO RELATED APPLICATIONS

This application claims the benefit of U.S. Provisional Patent Application No. 61/929,441, filed Jan. 20, 2012, titled "NEURAL NETWORK FOR VIDEO EDITING", the contents of which is hereby incorporated by reference in its entirety and are not admitted to be prior art with respect to the present invention by the mention in this cross-reference section.

BACKGROUND

Automated video recording devices enable their users to record hours of footage of their activities without a human camera operator (except possibly at setup and at taking down or the automated video recording device). More and more footage is recorded during automated cooperative tracking wherein the subject is part of the tracking system by carrying a locator device, or beacon, for example. The rise of action cameras and smartphones has also greatly increased the volume of video recordings that require review and editing before sharing with others. The vast amount of footage generated may necessitate spending even more time video editing than was spent on recording the video footage. One may employ an editing service to do this work but doing so is expensive and may not yield the desired results.

SUMMARY OF THE INVENTION

In accordance with a preferred embodiment hereof, this invention provides a neural network of interconnected video recording systems comprising: a plurality of video recording systems that record video footage and metadata; a host computer system having machine learning capabilities and a video editing algorithm to automatically edit video recorded by the plurality of video recording systems; wherein the plurality of video recording systems are communicatively coupled with the host computer system; wherein the video editing algorithm uses the recorded video footage and metadata to automatically edit recorded video footage; wherein the video editing algorithm is modified based on user input that modifies the automatic editing made by the video editing algorithm for subsequent editing.

According to a preferred embodiment hereof, this invention provides a method of automated video editing, comprising the steps of: providing a network of video generating devices coupled with a device permitting video editing, wherein said video generating devices are operated by one or more users wherein said users may make video editing decisions, and wherein said network further comprises a computer system for storing data and running video editing algorithms; using said network to record and store videos, said videos being recorded at least in part based on video generating decisions made by users and the recorded videos having metadata associated with them; automatically editing the videos using the video editing algorithms; permitting users to modify the video editing by the video editing algorithm wherein the user editing decisions are recorded and stored; revising the video editing algorithms based on data comprising the videos, the user editing decisions, and the associated metadata.

According to a preferred embodiment hereof, this invention also provides a method of automated video editing comprising the steps of: providing a network of video generating devices coupled with devices permitting manual video editing by users wherein the network further comprises a host computer system for storing video data, metadata, and video editing algorithms, wherein the video editing algorithms may be periodically updated; using the network to produce videos of various activities at various events and at various locations; collecting and storing metadata regarding user identities, activities, locations, events; automatically recognizing activity types in videos; developing correlations between video data and metadata; providing video editing suggestions based on the video editing algorithms and in part based on the activity types; editing videos by users and recording and saving user edits as user preferences; aggregating editing preferences of users; updating the video editing algorithms based in part on the aggregated user preferences.

According to a preferred embodiment hereof, this invention provides each and every novel feature, element, combination, step, and/or method disclosed or suggested herein.

DETAILED DESCRIPTION

Figure 1:
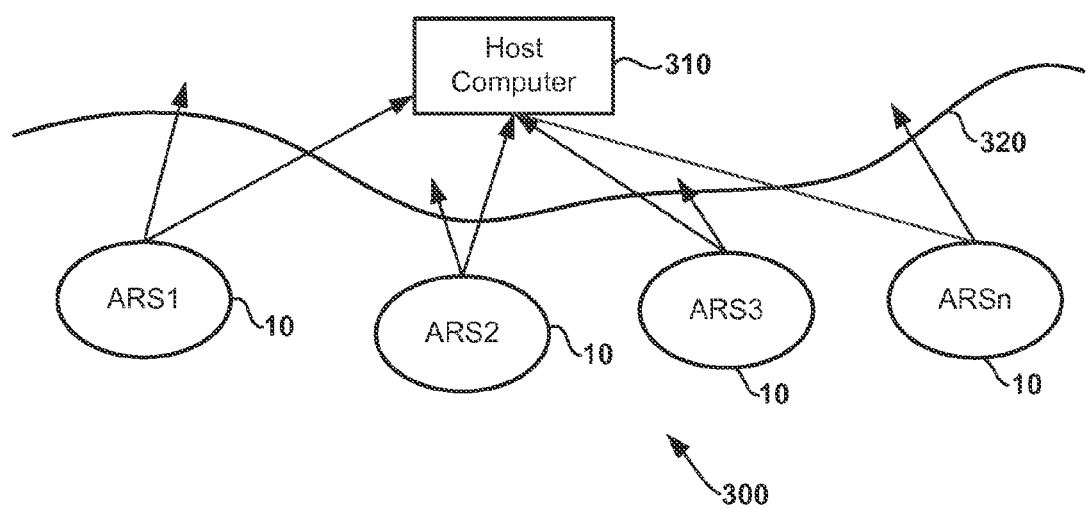
FIG. 1 is a schematic diagram illustrating a network of automatic recording systems according to a preferred embodiment of the present invention.

"In machine learning, artificial neural networks (ANNs) are a family of statistical learning algorithms inspired by biological neural networks (the central nervous systems of animals, in particular the brain) and are used to estimate or approximate functions that can depend on a large number of inputs and are generally unknown. Artificial neural networks are generally presented as systems of interconnected 'neurons' which can compute values from inputs, and are capable of machine learning as well as pattern recognition thanks to their adaptive nature." See Artificial Neural Network, Wikipedia, available at http://en.wikipedia.org/wiki/Artificial_neural_network. The invention herein employs such artificial neural networks (referred to simply as neural networks) in order to solve the problem of editing large amounts of video footage.

In a preferred embodiment, the present invention involves machine learning wherein a starting algorithm is developed based on experience and data such that the algorithm is capable of proposing edits and wherein the algorithm further remembers individual user reaction to and interaction with those proposed edits. In the process of learning, the algorithm is modified to incorporate the individual user reactions and interactions. This process of machine learning is replicated within a neural network of users by several or numerous users; their reactions to proposed edits contribute to the learning by the network such that the inventive system learns how specific individuals, as well as people in general, edit their videos. The neural network may record, save, and use some or all metadata (biometric data, vitals data, Inertial Measurement Unit data, location data, time data, etc.), so that, over time, the network becomes better as an automatic editor and keeps adding more details to the editing algorithm. In addition, the neural network of the present invention may be used to improve the automated tracking, automatic video recording, and/or automatic video production algorithm. The system may also expand the scope of what it can learn in order to automatically improve recording and editing functions. The video recording systems that comprise the network may be manually operated, automatic, or robotic, or any combination thereof. While automatic recording systems perform recording according to a recording algorithm and, usually, according to user input at the start of the recording session, robotic recording systems may accept continuing user input and may also be capable of responding to unforeseen changes in the circumstances of the recording. In this disclosure, automatic recording systems may be robotic recording systems.

The inventive solution to the problem of editing vast amounts of video footage into shorter clips that capture the highlights of a long video and that are pleasant to watch, as outlined and explained herein, comprises methods and actions to observe, to measure, and to record metadata associated with the video recording during video recording and generation of algorithms that, based at least in part on these metadata, parse the content (pixel data, audio data) of the recorded video to detect the type of activity, the events, the highlights and pauses in the activity, and use the algorithm for editing the video. Metadata includes such data as accelerometer readings, velocity data, vitals data, location and time data, etc. In addition, the system may accept (and/or ask for) user input regarding the type of activity, events, highlights, and pauses and use such metadata as well. Moreover, the algorithm may also rely on metadata related to temporary loss of data (content) and their relationship with recording system operational metadata (e.g., loss of connection during cooperative recording). Another aspect of the present invention's solution to the problem outlined above is employing a video editing device that learns and improves editing choices over time by noting changes made by the user once the system has proposed an edit. This may be realized in the form of a stand-alone device or it may be in the form of a computer running a program or a mobile device running an application. Another aspect of the present invention's solution to the problem outlined above is accomplished by creating a neural network of interconnected automated video recording instruments and/or a network of computers or devices running shared video editing software and/or accessing a shared video editing database wherein the users edit within the network and machine learning methods are employed to first monitor the editing decisions, then assist the editing decisions, and finally to gradually replace manual editing with automated editing based on a combination of stored personal editing preferences and editing methods and preferences that are prevalent within the large dataset available to the network. The metadata in video files may include additional information that makes editing easier such as by correlating accelerometer data, velocity data, vitals data, location data, and time data with good editing points in content (pixel data and sound data). Optimally, over time, the editing system acquires such a large database of metadata associated with video data that the system can also edit videos that themselves contain little or no metadata.

FIG. 1 is a schematic diagram illustrating a network of automatic recording systems according to a preferred embodiment of the present invention. FIG. 1 illustrates a preferred embodiment of the network of automatic recording units that form (together with their associated computing devices) the neural network of the present invention (network 300). Network 300 preferably comprises participant automated recording stations 10 (ARS1, ARS2, ARS3, ARSn, indicating that any number of automatic recording stations may connect with network 300). Each automated recording station is preferably connected to host computer 310 through an Internet connection shown as cloud 320. Host computer 310 is preferably a computer system with the capability to accommodate and process all data from all ARS participants of network 300. While only one host computer 310 is illustrated, it is understood that host computer 310 comprises a facility housing a multiplicity of computers configured to carry out the processes of the present invention. Host computer 310 is also preferably connected to a variety of Internet web sites (e.g., social media web sites such as Facebook, Twitter, and the like) for automatic posting of content videos and for receiving input from consumers who watch those videos. An example of an automated recording station that uses cooperative tracking (where the subject is part of the tracking system by carrying a locator device) to automate the recording process is the SOLOSHOT device sold by Soloshot, Inc., of San Antonio, Tex.

Figure 2:
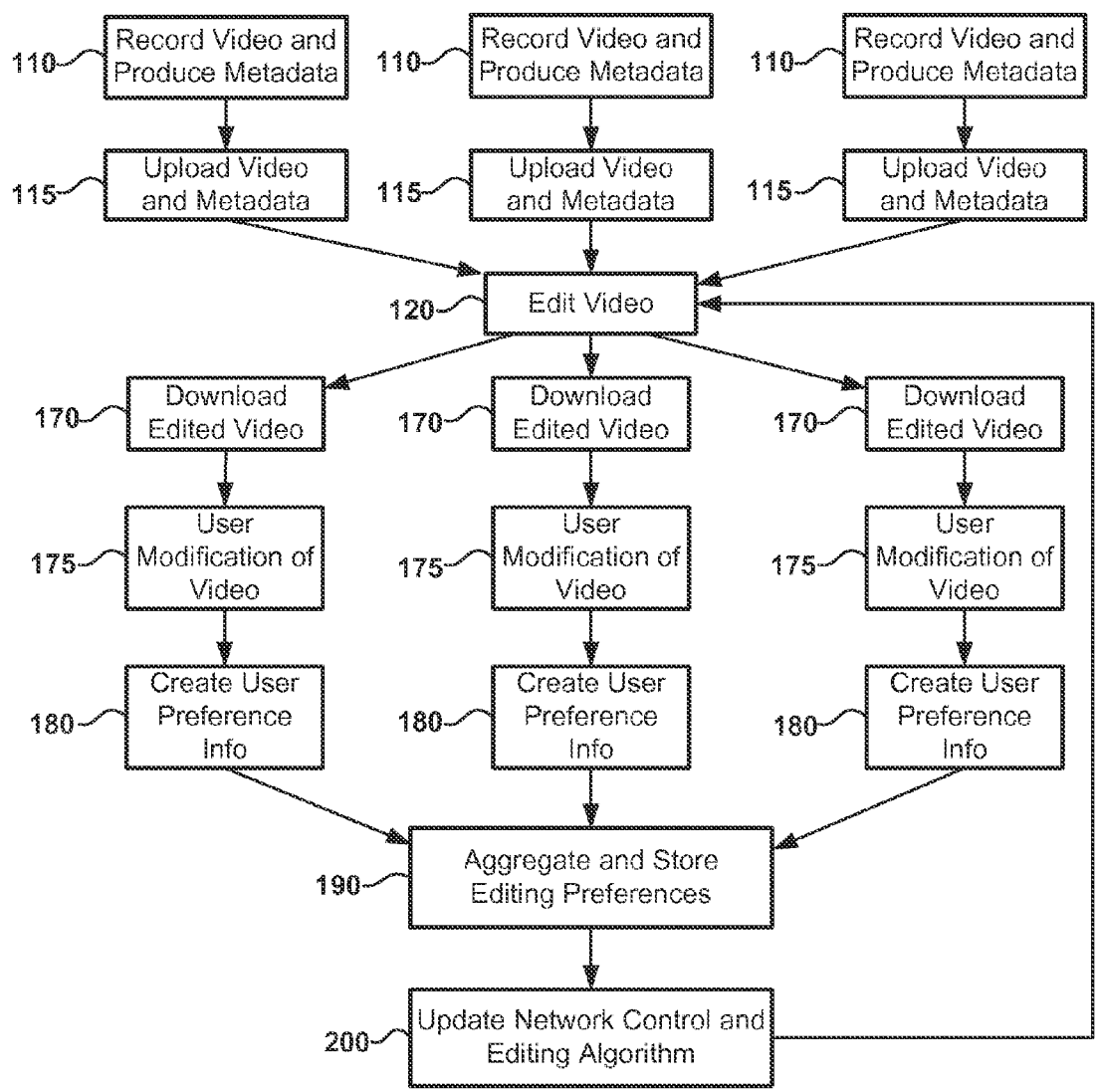
FIG. 2 is a flow diagram illustrating the machine learning process of the neural network according to a preferred embodiment of the present invention.

FIG. 2 is a flow diagram illustrating the machine learning process of the network according to a preferred embodiment of the present invention. Initially, video content must be recorded and metadata associated with the recorded video must be established. The automated recording stations record videos and produce metadata in step 110 as shown. Methods of producing metadata are described herein. As shown in FIG. 1, it is envisioned that the neural network of the present invention will comprise a multiplicity of automated recording stations (also referred herein from time to time as video recording systems); FIG. 2 illustrates the actions of three such stations. Next, the video footage and metadata (data that is not pixel data) are uploaded to host computer 310 (see FIG. 1) in step 115. Once uploaded, host computer system 310 edits the uploaded videos in step 120 using a video editing algorithm. The amount of editing by host computer system 310 depends on the recorded video that is uploaded to host computer system 310 and on a given user's preferences and inputs. For example, in some cases, the edited video version may not differ at all from the uploaded version. In other cases, the editing may be limited to marking proposed edit points in the videos. In other instances, a fully edited version may be created. The edited video is downloaded to the automated recording station that produced the original video in step 170. In step 175, a user may modify the edits made by host computer system 310. Additionally, a user may input editing preferences for future use in step 180. If the user is satisfied with the downloaded edits, step 175 may be skipped. Even if the user is satisfied with the downloaded edits, this is registered as a preference in step 180 meaning that the user approved the edits done by host computer system 310. When a user disregards the edits made by host computer system 310, this is also recorded as a preference. Editing preferences are uploaded to the host computer system 310 where they are aggregated and stored in step 190. The network control and editing algorithm (also referred to herein as the video editing algorithm) of the neural network is updated in step 200 based on the aggregated and stored preferences and based on the earlier uploaded footage data and metadata. The updated video editing algorithm is used for subsequent edits as signified with the arrow from step 200 to step 120. In the case where some or all participants in the neural network are automated video recording systems based on cooperative or other tracking methods, the neural network also includes machine learning for the control algorithm of the tracking methods.

Figure 3:
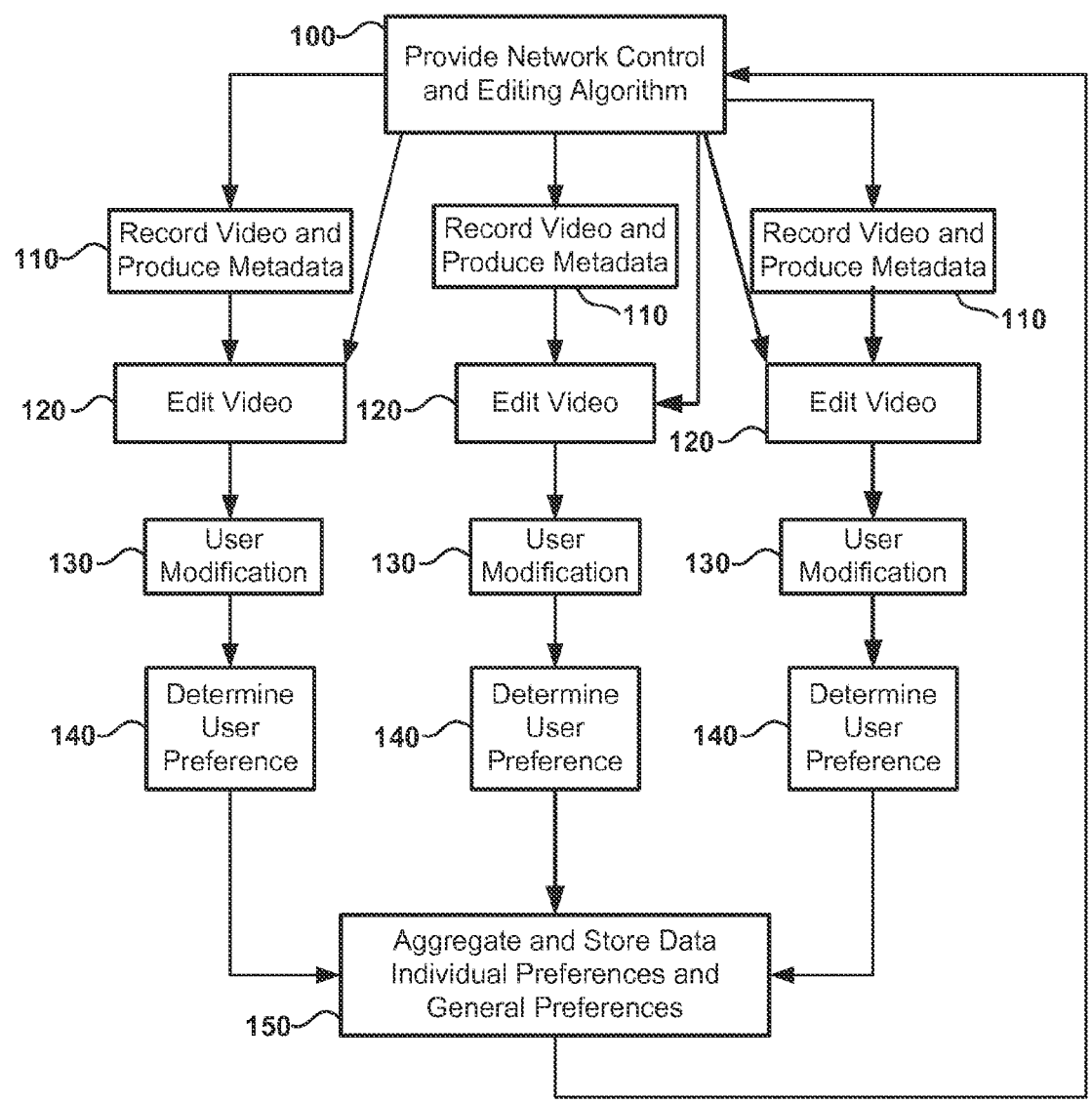
FIG. 3 is a flow diagram illustrating another preferred embodiment of the machine learning process of the neural network.

FIG. 3 is a flow diagram illustrating another preferred embodiment of the machine learning process of the neural network of the present invention. A network control and editing algorithm is provided (it may be on a central computer system) in step 100. The method shown in FIG. 3 illustrates use by three users; however, as above, it is envisioned that the neural network has a large number of users. Videos or other content are produced along with metadata in step 110, at least in part according to the provided network control and editing algorithm. In other embodiments, content and metadata may be produced entirely independently from the network control and editing algorithm. Editing of the content occurs in at least step 120 of video algorithm based editing ("Edit Video") but in most instances with user input as well as noted in step 130. If the user is satisfied enough with the machine produced edit, step 130 may be skipped. The combination of steps 120 and 130 results in determining user preferences, step 140. In the event that step 130 is skipped, this may be stored as a preference or the user may input one or more preferences in step 140. Preferences for each user are stored and aggregated to produce individual preferences and general preferences in step 150. These aggregated data and preferences are employed to modify the network control and editing algorithm that is then used for the next round of editing and/or recording (producing video and content); this is shown in FIG. 3 as the feedback arrow from 150 to 100. One of the differences between the methods of FIG. 2 and that of FIG. 3 is that in FIG. 3, editing is carried out locally (at the recording system) and not centrally (at the host system).

The neural network of the present invention may work with any video recording device, although its primary application seen today is in the area of videos recorded with automated tracking systems, action cameras, and drone based cameras. The system of the present invention is further capable of evaluating content and metadata to generate an edited video containing content from multiple sources. In another preferred embodiment, the inventive system generates real time or near real time broadcast based on simultaneous video recordings of multiple recording units within the system; this function comprises feeding into broadcast video recorded from the best available angle, complete with best available replays, with minimal input from a traditional production manager. In another preferred embodiment of the present invention, an accessory plugs into cameras or otherwise communicates with cameras or an editing system (such as, for example, by time stamping all video content and subject data) such that over time, the user's individual software and the network collects data on how different people edit different videos, how those videos and edits correlate to other data collected, recognizes certain correlations and trends, proposes video edits, and remembers how to best edit a video, including also music videos and music editing for action videos. The addition of natural sound, sound effects, and music may also be part of the editing and optimization of the editing algorithm.

In a preferred embodiment of the present invention, a software interface is made available where the software proposes certain edit points in the video wherein the edit points may be easily adjusted. New edit points may also be added. The system notes and remembers how the proposed edit points were changed and attempts to find new correlations (or to adjust old ones) between pixel data and all the other data such that it can propose an improved edit the next time. When such software systems are connected to each other or when all video and other data is shared as in host computer system 310, the system improves faster. In another preferred embodiment the system also proposes edits to the general public, such as by posting editing variations on remote locations, such as video sharing sites, and other social media sites, and measures various reactions of people to editing decisions and improves itself based on achieving certain desired results.

The actual tracking algorithm that is employed to perform cooperative automatic tracking by robotic cameras may also be improved using the inventive machine learning based editing process. The method of improving tracking algorithms may either be based on the interaction between a single user and their object tracking system or it may work by connecting many users together; in both cases the system learns what tracking decisions result in acceptable (or better) video both generally and down at the pixel level, as related to real-time data associated with the cooperative tracking algorithm. In other words, the system develops improvements in the pixel-tracking algorithm based on comparing it to the results of the tracking achieved by the cooperative object tracking.

Existing computer vision based tracking methods all require an initialization which involves seeding the algorithms with information on what the object to be tracked looks like. This is a problem if the system is never given any visual information about the object to be tracked. The inventive system described herein learns first what those pixels look like that are moving with the beacon attached to or otherwise moving with the object that being filmed. Also, the system learns which pixels are moving with other pixels that have been determined to be moving with the beacon. Also, the system can detect an object's pixels by recognizing groups or sets of pixels that are not moving as the background does and are therefore likely to be related to the object (this is possible if the camera is continually aimed towards the object by using a cooperative object tracking method, since the tracked moving object will remain relatively stationary in the video frame as compared to the "moving" background). An IMU (Inertial Measurement Unit) on the target can be used to supply supplemental motion data to the system in order to improve the pointing of the camera and/or to assist the learning process of the video tracking algorithm.

Specific areas of data that the neural network may collect and use in the process include location (in the sense of venue as well as latitude, longitude and altitude), activity type (surfing, skiing, motocross, etc., and which may at least initially be entered or chosen by a user), vital statistics (such as heart rate, sweating, etc.), motion data (velocity, g-forces experienced, etc.) and data collected from the videos themselves, or collected from user input during editing (video title, tagging participants, pixel tracking data, scene selection, etc.). Interconnected but individually used automated video recording apparatuses and professional installations that comprise whole systems of automated video recorders may be parts of the neural network in which the data collected from the individual devices are used to make the editing and/or tracking algorithm learn from, be improved by, and potentially shared with other users.

Location, biometric, vitals, and telemetry data are compared to pixel tracking data or just pixel data to build a multivariate database of potentially correlated and/or non-correlated variables.

Such an automatically improving neural network for video editing might start with only customer provided edits. Or, customers might use a simple user interface in which all video is shown on a timeline with suggested edit points and the user can shift those edit points around. The system preferably asks the user why such a change was made and either make adjustments to the algorithm automatically or shares the response with the authors of the algorithm thereby letting them decide what, if any, improvements are needed or warranted. Another preferred optimization method involves posting a video to an online video database and recording feedback from consumers of the video, either as passive responses (length of time spent on watching the video) or active responses (e.g., downloads, responses to questions, buttons or other feedback prompted during or after consuming a video). Similarly, data such as video tags, comments, and websites or applications where the video is embedded are data that could be used to improve the automatic determination of a video's content without direct input from a human.

The inventive system may be used in conjunction with automatic video recorders to create what essentially is a robot production crew manipulating several cameras and wherein the system automatically decides which cameras to switch on or off, controls switching between cameras and learns to broadcast better. Also, the system provides for crowd feedback (i.e., feedback from a multitude of users) being employed to select the best footage of events and use such crowd feedback for further improving the operation of a robotic production crew. This description of a robotic production crew does not imply that humans cannot be involved in the production, only that at least a significant part of decision making may be automated.

The major tasks that are required to achieve automated video editing and self-improving automated video editing are: 1) activity recognition, 2) event recognition, 3) pause recognition, 4) unusual event recognition, and 5) location recognition.

Additional tasks that the neural network may perform as a result of performing the major tasks above include collecting information for network use such as venue identification, identification of non-participants at the venue (such as advertising target audience), and adding all data to historical "big data" for future cross-referencing. Further, feedback for improved video recording is also performed by the neural network as an additional task.

Regarding activity recognition, the neural network determines the activity recorded. The system may automatically optimize the determination. The system may learn the activity by, for example, asking the user what activity they are performing or by accessing the video later and having an individual determine the activity and enter it into the database or directly into the algorithm. The editing algorithm may have the capability for asking for user input and/or accepting user input. Alternatively, the system may recognize the activity based on the types of motions involved (for example, soccer-related motions are very different than surfing-related motions. Certain or all system parameters, such as editing, tracking or automatic sharing are automatically adjusted based on the determined activity to optimize system performance. For example, if it has been determined that the system is being used to film soccer, the system can assume that the object will remain on a level playing field and tracking algorithms can take this information into account therefore increasing pointing accuracy and use tighter shots.

In addition, data on customer usage can be uploaded via the Internet and accessed by companies for marketing purposes. Taken a step further, once an event is identified, bystanders nearby can be identified based on their cellular location information. Bystanders near an event can be assumed to be interested in that type of event being recorded and can then be marketed to more efficiently. If this assumption is wrong, the system can note and automatically adjust itself according to how users interact with, for example, any advertising sent their way.

The ways in which the system detects what type of activity is being filmed comprise the following:

(1) User history may be helpful in many instances as a factor in narrowing down the type of activity filmed. Similarly, the system may access other information, such as social profile or email information or text messages as well as the interests of social connections in search of clues as to the types of activities the user may be interested in or may be immediately about to participate in.

(2) Location. By knowing where a camera is set up at in the world and where the transmitter user is located, in many cases one may predict the type of activity being filmed. For example, if recording is being done at the GPS coordinates of a known race track, it is likely that racing will be filmed. In some cases, the geographic location will narrow down the likely possible types of activities. For example, if time camera is set up on a coastline, it is likely that surfing, kitesurfing, bodyboarding, windsurfing, standup paddle boarding, sailing, jet skiing, or boating will be performed. Velocity and other telemetric data may help to narrow down the activity or highlights of the activity.

(3) Motion data. Motion data, either in combination with or independently from geographic location data, can be used to further identify the activity being performed. For example, surfing tracking data can be characterized by one to ten minutes of very slow movement (drifting while waiting for a wave), followed by short intense accelerations of the tracking device detectable if an IMU is on the tracking device (surfer paddling to catch the wave), followed by three to 25 seconds of a five to 40 mph path traveling in generally a consistent direction with possible cutbacks (surfer on the wave), followed by zero to 60 seconds of no tracking data (surfer underwater), followed by about one half to three mph path which may have lots of direction changes with one to 30 second periods of no data (surfer paddling back out against the waves). Similarly, a surfer getting barreled (i.e., a large wave may temporarily cover the surfer such that satellite communication to the locating device is temporarily lost or ineffective) will have a characteristic fingerprint of data gathering and transmission. Other similar types of motion analysis can be studied for other types of activities and put into the system. In addition, activity analysis can be executed by the network resulting in self learned improvement over the initial input. If the tracking system is Internet-connected, the whole network of tracking devices can collect user data to make increasingly better predictions of the type of activity being performed by any single tracking unit.

(4) Individual patterns. Individual users may have individual patterns that can modify the generic activity pattern when used for editing videos of that particular user.

(5) Vitals data. Heart rate and similar data collected from the subject wearing a transmitter may also be used to automate activity detection, editing, and other activities.

With the type of activity being detectable and used in combination with video capture, the network can learn video characteristics of the different types of events, and as a result, video recognition (such as pixel analysis) is able to detect what type of event is being filmed. With the system identifying the type of activity being filmed, the system is capable of automatically editing the video footage based on previous data regarding what humans consider interesting. As stated above, activity recognition may be based in part on known user history, on known location (venue), and may also be made in part through recognizing characteristic motions of the tracking device. Finally activity recognition may be based on video recognition of the activity or a combination of any and all of the listed methods. As the system provides users with automatically edited video, then users have the option to manually adjust the edited video to their liking in which case the system gathers data on the additional edits made and aggregates it with all other data of other user's adjustments in order to improve the automatic video editing algorithm for everyone.

Event recognition may be based on a combination of location and activity recognition but other factors may play a role. User input is helpful. Location, combined with recording date and time may provide useable clues in case of publicly staged and advertised events. Otherwise, activities themselves are characteristically different, for example, training sessions and competitions have different characteristics. Also, microphones located at the subject may record active commands, such as shouting "highlight" versus passive statements such as, "Hey, did you see that dolphin!" or "That was sick".

Pause recognition may be based on location details. Examples may include a surfer leaving the water, or a player leaving the soccer field, etc. Again, individual patterns and aggregated user experience will make it possible to edit out such footage with confidence. This system may be combined with other commonly owned inventions, such as those described in U.S. patent application Ser. No. 13/801,336, titled "SYSTEM AND METHOD FOR VIDEO RECORDING AND WEBCASTING SPORTING EVENTS", PCT Patent Application No. PCT/US2013/41187, titled "HIGH QUALITY VIDEO SHARING SYSTEMS", PCT Patent Application No. PCT/US2013/070903, titled "AUTOMATIC CAMERAMAN, AUTOMATIC RECORDING SYSTEM AND AUTOMATIC RECORDING NETWORK", the contents of which are incorporated herein by reference in their entirety. Such documents discuss targeted filming locations where the user defines an area for filming or an area where filming should not occur within a coordinate system, such as the global coordinate system. The effect is, for example, that the automatic recording systems do not record once the subject is out of the ocean and on the beach.

Unusual event recognition is important to not miss significant footage that does not fit the usual pattern of an activity. Network learning and image recognition methods may be useful in accomplishing this. If the user streams the footage directly to the network in real time, the network may be capable to do much more than editing. For example a player that is hurt on the soccer field may necessitate filming that event even if it appears that the activity has come to a pause. Image recognition of medical personnel entering the frame may be used to identify' this situation. This can be utilized for immediate action for the tracking camera and later for the editing phase as well. As another example, the neural network acts as our of eyes and ears, becomes "conscious", and automatically senses and alerts problems (if a car accident occurs in its periphery, the system automatically dials 911, or while the recording system is following a surfer, the neural network may sense a drowning victim in the background, or even recognize whale breaching and alerts the network). The word conscious is in quotation marks here because we are not suggesting actual consciousness. Rather, the network may be able to determine the difference between the way things (the object of the filming and the background, each separately and in combination) normally look and the way they appear during a particular filming.

A preferred embodiment of the invention is engaging in the process we call "network learning", wherein image recognition and cooperative object tracking are both employed. In this embodiment the recording unit (or units) in the system use one or more tracking devices in combination with image recognition, such that the system initially tracks the object by following a locating device (sometimes referred to as a beacon) but video recognition algorithms detect (and/or learn) the pixel characteristics of the object (sometimes referred to as target) and use that information to improve tracking. For example, the system knows the target is moving from left to right (from the viewpoint of the camera). The image recognition software attempts to detect the grouping of pixels that appears to be moving from left to right against the background, and when identified, the system remembers the characteristics of that grouping of pixels (color, size, shape, etc.). The remembered pixel data is used to better track the object. (Note that the object may be stationary within the footage frame and the background is moving from right to left within the frame.) Actions that may be taken as a result of identifying the target within the frame include 1) positioning the camera to center the identified target in the frame; 2) refining the calibration of the tracking system based on line-of-sight (LOS) information; 3) continuing to track the object even if there is no information from the tracking device, 4) recognizing the object when it is not in motion. We have previously described how to use LOS information to refine calibration in U.S. patent application Ser. No. 13/726,222, titled "APPARATUS AND METHOD FOR ORIENTING A CAMERA AT A FREELY MOVING TARGET", U.S. Pat. No. 8,749,634, titled "APPARATUS AND METHOD FOR AUTOMATIC VIDEO RECORDING", and U.S. Pat. No. 8,704,904 "PORTABLE HIGH QUALITY AUTOMATED VIDEO RECORDING SYSTEM", which are hereby incorporated herein by this reference in their entirety. The distance information from the tracking system can be used to assist the image recognition algorithm, for example the object's pixel cluster size will vary based on zoom level and distance from the object. Once the system has an initial detection of the object's pixel cluster size at a known distance and zoom level (i.e., once both distance and zoom level are already known by the system), the system calculates how the object's pixel cluster size will change at different distances and zoom levels to help the video recognition software recognize the object at different distances and zoom levels. So, initially, the network uses cooperative object tracking, but in the long run, as a result of the improved pixel tracking, the system becomes able to track objects that are not cooperating with the system. If the network cooperates with a cellular phone company, then after the location, venue, and/or activity of the filming has been identified, the network recognizes the event and the phone company may detect its customers in the vicinity based on their phone location data. It would be reasonable to assume that those customers are also interested in the type of event that is filmed. For example, filming a youth soccer game, where the system determines that the user is at the soccer game based on their motions and or location and estimates the age of the user based on the velocities and or biometrics. Then all phone company customers in that vicinity could be flagged as being interested in youth soccer.

During the cooperative object tracking, video recognition algorithms can be used for collecting additional customer data.

Different embodiments, features and methods of the invention are described with the aid of the figures, however the particular described embodiments, features and methods should not be construed as being the only ones that constitute the practice of the invention and the described embodiments, features and methods are in no way substitutes for the broadest interpretation of the invention as claimed.

What is claimed is:

1. A neural network of interconnected video recording systems comprising:
    a) plurality of video recording systems that record video footage and metadata;
    b) a host computer system having machine learning capabilities and a video editing algorithm to automatically edit video recorded by said plurality of video recording systems;
    c) wherein said plurality of video recording systems are communicatively coupled with said host computer system;
    d) wherein said video editing algorithm uses the recorded video footage and metadata to automatically edit recorded video footage;
    wherein the video editing algorithm is modified based on user input that modifies the automatic editing made by the video editing algorithm for subsequent editing.

2. The neural network of claim 1, wherein said plurality of video recording systems comprise one or more automatic video recorders.

3. The neural network of claim 1, wherein said plurality of video recording systems comprise one or more robotic video recorders.

4. The neural network of claim 1, wherein each of said plurality of video recording systems permit user input for video editing.

5. The neural network of claim 4, wherein each of said plurality of video recording systems determines user editing preferences and provides said determined user editing preferences to said host computer system.

6. The neural network of claim 1, wherein each of said plurality of video recording systems uploads unedited videos recorded by the video recording system to said host computer system.

7. The neural network of claim 6, wherein said host computer system edits said unedited videos and the edited video is downloaded to the video recording systems that uploaded the unedited video.

8. The neural network of claim 6, wherein said host computer system edits the unedited videos and sends edited videos to remote locations for public viewers.

9. The neural network of claim 8, wherein said host computer system accepts input from the public viewers and adds such input to the metadata.

10. The neural network of claim 6, wherein each of said plurality of video recording systems permits user input for video editing, determines user editing preferences, and upload said user editing preferences to said host computer system.

11. A method of automated video editing, comprising the steps of:
    a) providing a network of video generating devices coupled with a device permitting video editing, wherein said video generating devices are operated by one or more users wherein said users may make video editing decisions, and wherein said network further comprises a computer system for storing data and running video editing algorithms;
    b) using said network to record and store videos, said videos being recorded at least in part based on video generating decisions made by users and the recorded videos having metadata associated with them;
    c) automatically editing the videos using the video editing algorithms;
    d) permitting users to modify the video editing by the video editing algorithm wherein the user editing decisions are recorded and stored;
    e) revising the video editing algorithms based on data comprising the videos, the user editing decisions, and the associated metadata.

12. The method of automated video editing of claim 11 further comprising the step of permitting users to make video generating decisions and recording and storing the video generating decisions as metadata.

13. The method of automated video editing of claim 12 further comprising the step of revising the video editing algorithms based on the video generating decisions stored as metadata.

14. The method of automated video editing of claim 13 further comprising using video generating algorithms.

15. The method of automated video editing of claim 14 further comprising revising the video generating algorithms based on data comprising the videos, the video generating decisions, the user editing decisions, and the associated metadata.

16. A method of automated video editing comprising the steps of:
    a) providing a network of video generating devices coupled with devices permitting manual video editing by users wherein the network further comprises a host computer system for storing video data, metadata, and video editing algorithms, wherein the video editing algorithms may be periodically updated;
    b) using the network to produce videos of various activities at various events and at various locations;
    c) collecting and storing metadata regarding user identities, activities, locations, events;
    d) automatically recognizing activity types in videos;
    e) developing correlations between video data and metadata;
    f) providing video editing suggestions based on the video editing algorithms and in part based on the activity types;
    g) editing videos by users and recording and saving user edits as user preferences;
    h) aggregating editing preferences of users;
    i) updating the video editing algorithms based in part on the aggregated user preferences.

17. The method of automated video editing of claim 16 further comprising the step of developing different video editing algorithms for different activity types.

18. The method of automated video editing of claim 16 further comprising using cooperative tracking algorithms to control the video generating devices.

19. The method of automated video editing of claim 18 further comprising saving and aggregating data generated during use of cooperative tracking algorithms.

20. The method of automated video editing of claim 19 further comprising using the aggregated data in developing video editing algorithms.

* * * * *